US 6,535,244 B1

(12) United States Patent
Lee et al.

(10) Patent No.: US 6,535,244 B1
(45) Date of Patent: Mar. 18, 2003

(54) IMAGE STABILIZING APPARATUS USING BIT-PLANE MATCHING AND IMAGE STABILIZING METHOD USING THE SAME

(75) Inventors: Gun-hee Lee, Suwon (KR); Sung-jea Ko, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/170,074

(22) Filed: Oct. 13, 1998

(30) Foreign Application Priority Data

Oct. 10, 1997 (KR) .......................... 1997-52105

(51) Int. Cl.[7] .......................... H04N 5/228; H04N 5/14
(52) U.S. Cl. .................... 348/208.1; 348/699
(58) Field of Search .............. 348/208, 699, 348/208.1, 208.4

(56) References Cited

U.S. PATENT DOCUMENTS

| | | | | |
|---|---|---|---|---|
| 5,786,847 A | * | 7/1998 | Katayama et al. | 348/47 |
| 5,903,307 A | * | 5/1999 | Hwang | 348/208 |
| 6,041,078 A | * | 3/2000 | Rao | 348/699 |
| 6,047,134 A | * | 4/2000 | Sekine et al. | 348/208 |
| 6,049,354 A | * | 4/2000 | Sekine et al. | 348/208 |
| 6,122,004 A | * | 9/2000 | Hwang | 348/208 |
| 6,130,709 A | * | 10/2000 | Sekine et al. | 348/208 |
| 6,144,405 A | * | 11/2000 | Toba | 348/208 |
| 6,396,538 B1 | * | 5/2002 | Kobayashi et al. | 348/208 |

FOREIGN PATENT DOCUMENTS

| | | | | |
|---|---|---|---|---|
| GB | 2 168 874 | 7/1986 | | H04N/5/14 |
| GB | 2 220 319 | 4/1990 | | H04N/5/21 |
| GB | 2 247 378 | 2/1992 | | H04N/5/14 |

OTHER PUBLICATIONS

Jian Feng et al., Adaptive Block Matching Motion Estimation Algorithm Using Bit–Plane Matching, Proceedings. International Conference on Image Processing, Oct. 23–26, 1995 (CAT No. 95CB35819), IEE Comput. Soc. Press, USA, pp. 496–499 vol. 3.*

* cited by examiner

Primary Examiner—Wendy R. Garber
Assistant Examiner—Lin Ye
(74) Attorney, Agent, or Firm—Sughrue Mion, PLLC

(57) ABSTRACT

An image stabilizing apparatus for correcting motion of an image recording apparatus by using a bit-plane matching technique, and an image stabilizing method thereof. In the image stabilizing apparatus, a field memory stores input digital image information. A motion detecting circuit calculates an amount of movement of input image information between two screens by using bit-plane matching technique and outputs a motion vector of the image recording apparatus. A motion correcting circuit corrects the motion of the image recording apparatus by moving image information stored in the field memory in an opposite direction to the direction of the motion vector.

8 Claims, 6 Drawing Sheets

IMAGE STABILIZING APPARATUS USING BIT-PLANE MATCHING AND IMAGE STABILIZING METHOD USING THE SAME

BACKGROUND OF THE INVENTION

1. Field of the Invention

The present invention relates to an image recording apparatus, and more particularly, to an image stabilizing apparatus and method for compensating a movement of the image recording apparatus to stabilize an image captured by the image recording apparatus.

2. Description of the Related Art

When photographing an object using an image capturing system, e.g., a camcoder, it is difficult to stably photograph the object without trembling of the hands. Such hand trembling may be serious when the image capturing system is small and light so that the user photographs while holding the camcoder with only one hand. Furthermore, as magnifications of zoom lens of the camcoder increases, a photographed image is seriously shaken by a minute movement of the camcoder.

In order to solve the problems, an image stabilizing apparatus for stabilizing the photographed image by automatically correcting tremblings of hands is required. In such an image stabilizing apparatus, the motion of the image capturing apparatus caused by trembling hands is detected by an image detection method. That is, a local motion vector of the image is detected by using a local motion vector detector. Also, a field motion vector representing the motion of an entire field, and an accumulated motion vector representing special circumstances, are detected using the local motion vector.

One of conventional motion detecting methods detects the motion of an image according to a motion of a representative point. In such a method, a predetermined number of representative points are set in a motion detecting area. Then, the motion of the image is estimated by detecting the motion of the predetermined representative points. Even though such a method has an advantage in that it can be implemented by a simple hardware, the method has a drawback in that the precision is deteriorated when there is a moving object in the image.

Another conventional image detecting method uses a band extract representative point (BERP) to detect the motion of the image. According to the motion detecting method using the BERP, characteristic points of an image are extracted by passing the image signal through a band filter in order to enhance the precision as compared with the method using the representative point. Then, the motion of the image is detected by use of the characteristic points. However, this method has a drawback in that the required memory capacity is increased.

Another conventional image detecting method uses edge pattern matching technique. The motion detection method using edge pattern matching technique can be implemented by a simple hardware and reduces the required memory capacity by extracting edge patterns from the image, and thus may overcome the problems of the method using BERP. However, according to this method, the detecting precision may be lowered when the illumination is low. Furthermore, it is difficult to detect the edge from the image.

Therefore, a motion detecting method which can reduce the required memory capacity, while maintaining the degree of precision in motion detection, is required.

SUMMARY OF THE INVENTION

To solve the above problems, one of the object of the present invention is to provide an image stabilizing apparatus for correcting motion of an image by bit-plane matching which is capable of precisely detecting motion according to a change in illumination and reducing memory capacity.

Another object of the present invention is to provide an image stabilizing method by using the image stabilizing apparatus.

In order to achieve one of the above objects, there is provided an image stabilizing apparatus for correcting motion of an image recording apparatus by using a bit-plane matching technique, and an image stabilizing method thereof. In the image stabilizing apparatus, a field memory stores input digital image information. A motion detecting circuit calculates an amount of movement of input image information between two screens by using bit-plane matching technique and outputs a motion vector of the image recording apparatus. A motion correcting circuit corrects the motion of the image recording apparatus by moving image information stored in the field memory in an opposite direction to the direction of the motion vector.

In order to achieve another one of the above objects, there is provided an image stabilizing method in an image recording apparatus, the method comprises the steps of: (a) detecting a motion vector of an input image using a bit-plane matching technique; and (b) correcting the motion of an image recording apparatus by moving the input image in the opposite direction to a direction of the detected motion vector.

Preferably, the step (a) comprises the steps of: (a1) extracting bit-planes from digital image information; (a2) selecting an optimum bit-plane among the extracted bit-planes; (a3) storing the optimum bit planes of a previous screen and a current screen; (a4) comparing pixel values of the optimum bit-plane of a previous screen stored in the bit-plane memory and pixel values of the optimum bit-plane in a current screen to calculate correlation values between the pixels bit-planes, and accumulating the calculated correlation values; and (a5) calculating the motion vector from the accumulated correlation value.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT

Figure 1:
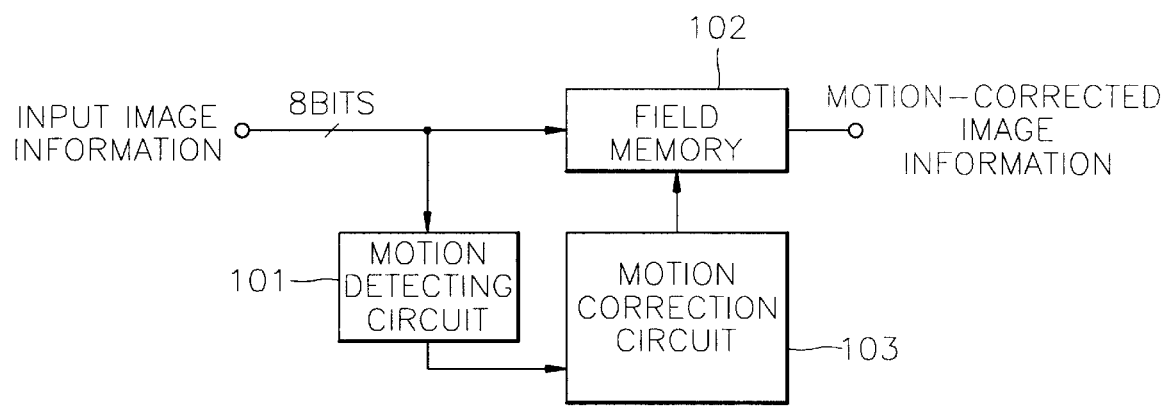
FIG. 1 is a block diagram of an image stabilizing apparatus using bit-plane matching according to the present invention.

Referring to FIG. 1, an image stabilizing apparatus includes a motion detection circuit 101, a field memory 102 and a motion correction circuit 103.

The field memory 102 receives and stores input digital image information. The motion detection circuit 101 detects a motion vector of the input image by calculating the amount of movement of input image information in a field unit according to a bit-plane matching technique. The motion correction circuit 103 receives the motion vector output by the motion detection circuit 101 and corrects the movement of the image information by moving the image information stored in the field memory 102 in a direction opposite to the direction of the motion vector.

The image stabilizing apparatus of FIG. 1 operates as follows.

Image information which is output by a charge coupled device (CCD) of an image capturing apparatus, such as a camcoder or by an image recording/reproducing apparatus such as a video cassette recorder is converted into digital image information via an analog-to-digital converter. Digital image information is stored in the field memory 102 and simultaneously input to the motion detection circuit 101. The amount of movement of image information between two consecutive fields is detected by the motion detection circuit 101 according to the bit-plane matching technique, and a motion vector is output according to the detected amount of movement. Image information stored in the field memory 102 is moved in the opposite direction to that of the motion vector from the motion correction circuit, and then output as a motion-corrected digital image signal.

Figure 2:
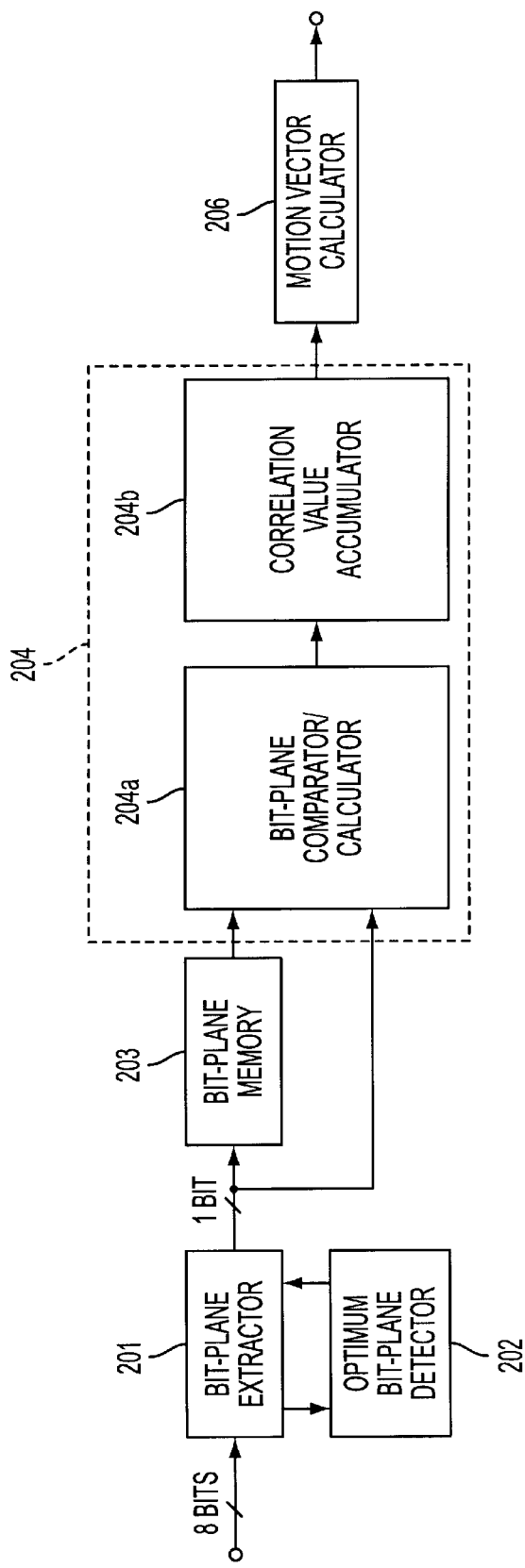
FIG. 2 is a detailed block diagram of a motion detection circuit shown in FIG. 1.

FIG. 2 is a detailed block diagram of the motion detection circuit shown in FIG. 1.

The motion detection circuit 101 of FIG. 2 includes a bit-plane extractor 201, an optimum bit-plane detector 202, a bit-plain memory 203, a correlation value detection unit 204, and a motion vector calculator 206. The correlation value detection unit 204 includes a bit-plane comparator/calculator 204a and a correlation value accumulator 204b.

The bit-plane extractor 201 extracts bit-planes from digital image information. The optimal bit-plane detector 202 determines the optimum bit-plane suitable for motion detection under a specific illumination condition. The bit-plane memory 203 stores the optimum bit-plane determined by the optimum bit-plane detector 202 among the bit-planes extracted by the bit-plane extractor 201. The bit-plane memory 203 stores at least two optimum bit-planes which are respectively extracted from at least two consecutive fields.

The correlation value detection unit 204 compares the pixel values between the bit-planes of the previous field and the current field stored in the bit-plane memory 203, calculates a correlation value between the pixels in the two bit-planes, and accumulates correlation values to generate an overall correlation value between the bit-planes. That is, in the correlation value detection unit 204, the bit-plane comparator/calculator 204a compares the bit-plane of the current field with the bit-plane of the previous field and performs a logic operation to calculate the correlation values between the pixels. The correlation value accumulator 204b accumulates correlation values output by the bit-plane comparator/calculator 204a.

The motion vector calculator 206 calculates a motion vector from the amount of movement of a detection window, having the minimum correlation value output by the correlation value accumulator 204b, that is, having the highest correlation, from the motion detection region of the previous bit-planes.

The operation of the image stabilizing apparatus shown in FIG. 1 will now be described in detail with reference to FIG. 2.

As shown in FIG. 2, the bit-planes, each of which is binary image information, are extracted from input digital image information by the bit-plane extractor 201. The optimum bit-plane is determined by the optimal bit-plane detection unit 202 among the bit-planes extracted by the bit-plane extractor 201 in consideration of the environmental conditions affecting the detection of the motion vector, most notably, changes in the illumination.

In general, when bit-planes are extracted from image information having k-bit gray level, each pixel value of the image information is expressed by the following equation (1):

$$a_{k-1}2^{k-1} + a_{k-2}2^{k-2} + \ldots + a_2 2^2 + a_1 2^1 + a_0 2^0 \tag{1}$$

Figure 3:
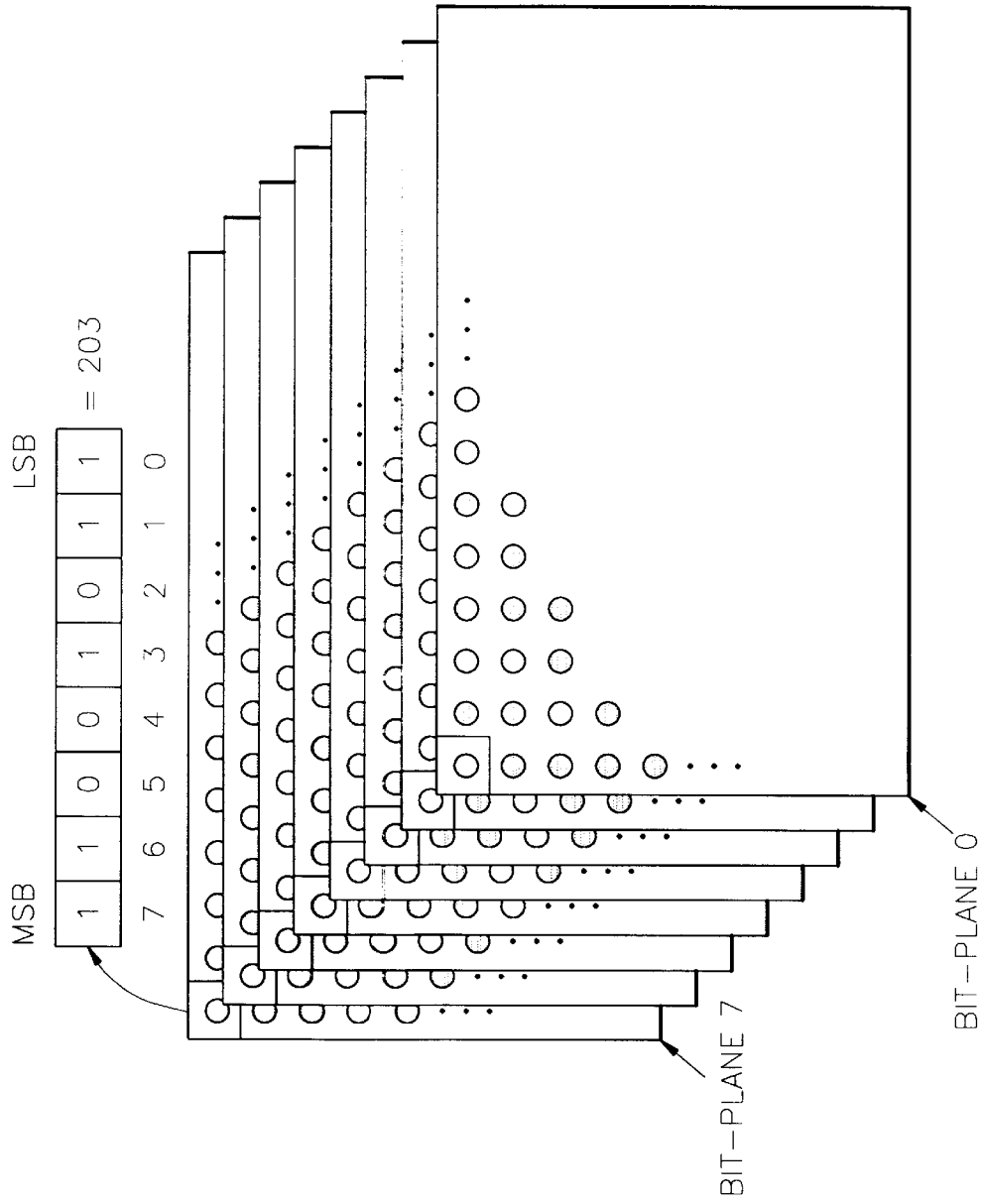
FIG. 3 illustrates bit-planes extracted from a 236-gray level image as an example of transforming digital image information into bit-planes according to the present invention.

That is, the pixel value is represented by k coefficients $a_i (I=0, 1, \ldots, k-1)$, and each coefficient is zero or one. Thus, image information having 256 gray levels can be transformed into eight bit-planes as shown in FIG. 3. For example. If a first pixel of the original image has a 203-the gray level, i.e. "11001011", the pixel value is represented by first pixels of eight bit-plane as shown in FIG. 3.

The bit-plane has the following characteristics according to the changes in the illumination. Under a normal illumination condition, information from which the shape of image can be detected is included in an upper bit-plane, and such information is very important to detect the motion of the input image. On the contrary, the binary values are randomly distributed at a lower bit-plane. Under a lower illumination condition, the bit-plane having a shape-detectable information moves to a lower bit-plane. On the other hand, under a higher illumination condition, the bit-plane having a shape-detectable information moves to an upper bit-plane. Since the visually important bit-plane moves according to changes in the illumination, it is necessary to select an optimum bit-plane in order to precisely detect the motion vector.

In order to select the optimum bit-plane according to changes in the illumination, a bit conversion rate $C_m$ of each bit-plane is calculated by the following equation (2):

$$C_m = \frac{\sum_x \sum_y [a_m(x, y) \oplus a_m(x-1, y)]}{M \times N}, 0 \leq m \leq k-1 \tag{2}$$

where ⊕ denotes an exclusive-OR operation (XOR), and M×N represents the size of the bit-plane.

With the exception of two lowermost bit-planes BIT-PLANE 0 and BIT-PLANE 1 in which binary data are distributed in a relatively random manner, the remaining bit-planes BIT-PLANE 2 through BIT-PLANE 7 exhibit characteristics that the bit conversion rate is higher for a lower bit-plane and lower for a upper bit-plane. Further, the bit conversion rate of each bit-plane tends to be lower when the illumination is lower. Thus, when selecting the optimum bit-plane, a relatively lower bit plane is to be selected under a low illumination condition while a relatively upper bit-plane is to be selected under a higher illumination condition, so that the motion of the image capturing apparatus is precisely detected.

Figure 4:
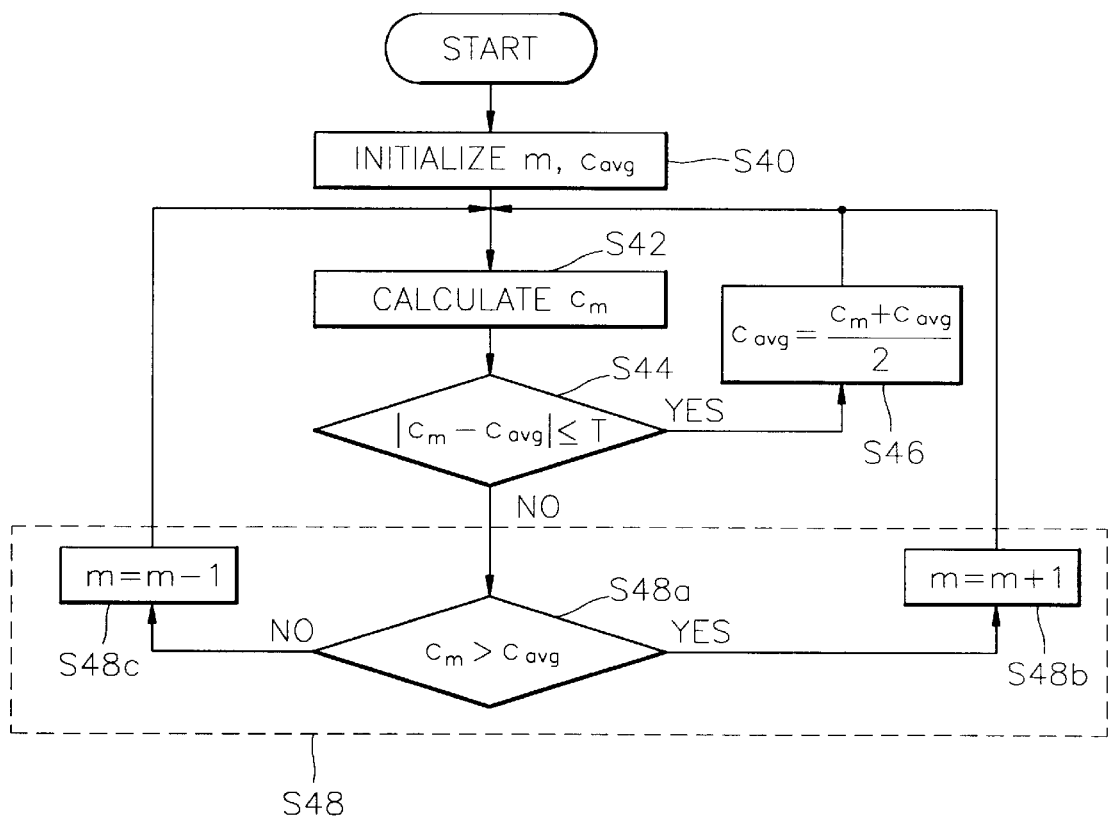
FIG. 4 is a flowchart illustrating a method of selecting an optimal bit-plane according to the present invention.

FIG. 4 is a flowchart illustrating a method of detecting the optimum bit-plane according to the present invention.

First, the optimum bit-plane detector 202 initializes an optimum bit-plane index m and an average bit conversion rate $C_{avg}$ 0 (step S40). In the present embodiment, the optimum bit-plane index m is initialized to a median value of the bit-plane indices. However, in an alternative of the present embodiment, the optimum bit-plane index m may be initialized to another value. Also, in the present embodiment, the average bit conversion rate $C_{avg}$ 0 is determined empirically during the use of the image capturing apparatus.

Then, a bit conversion rate $C_m$ of the selected bit-plane is calculated (step S42). In step 44, it is determined whether the absolute value of the difference between the bit conversion rate calculated in the step 42 and the bit conversion rate determined in the step 40 is equal to or less than a threshold value T (step S44).

If the absolute value is equal to or less than the threshold value T in the step 44, the current bit-plane is maintained. At this time, the average bit conversion rate $C_{avg}$ is adjusted by the following equation (3):

$$c_{avg} = \frac{c_m + c_{avg}}{2} \quad (3)$$

However, if the absolute value is greater than the threshold value T in the step 44, the bit-plane is changed into another one (step S48). In order to change the bit-plane, it is determined whether the calculated bit conversion rate $C_m$ is greater than the average bit conversion rate $C_{avg}$ (step S48a). If the bit conversion rate $C_m$ is greater than the average bit conversion rate $C_{avg}$ in the step 48a, the bit conversion index is incremented and a bit-plane which is upper to the current bit-plane is selected (step S48b). If the bit conversion rate $C_m$ is not greater than the average bit conversion rate $C_{avg}$ in the step 48a, the bit conversion index is decremented and a bit-plane which is lower to the current bit-plane is selected (step S48c). After the adjustment of the average bit conversion rate $C_{avg}$ or the optimum bit-plane index, the steps S40 through S48c may be carried out to further optimize the optimum bit-plane index.

As described above, in the present invention, the optimum bit-plane detector 202 generates an the optimum bit-plane index by using the bit conversion rate so as to detect the optimum bit-plane. As a result, the optimum bit-plane is detected according to the change in the illumination.

Figure 5:
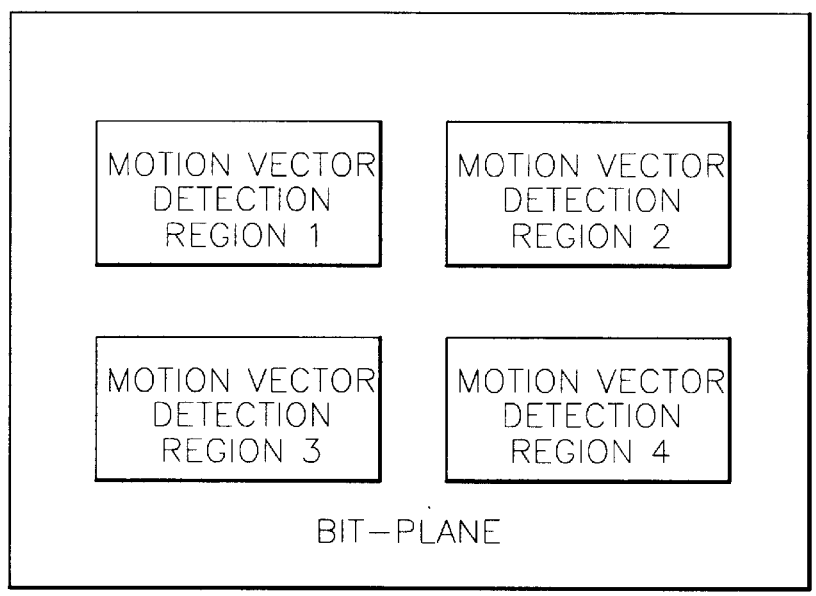
FIG. 5 illustrates motion vector detection regions in a bit-plane according to the present invention.

The correlation value detection unit 204 sets a predetermined region in the detected optimum bit-plane as a motion detection region as shown in FIG. 5. Further, the correlation value detection unit 204 compares pixel values of the optimum bit-planes of consecutive fields, and accumulates the comparison results to obtain a correlation value. The motion vector calculator 206 detects a motion vector of the image by use of the calculated correlation values from the correlation value detection unit 204.

When photographing an image using an image capturing device, a moving object is generally located at the center of the screen while the border of the screen is assigned to the background. Thus, in order to reduce the amount of calculation and the required memory capacity, it is preferable to set a motion detection region and determine the motion vector by use of pixels in the motion detection region rather than all the pixels of the entire image. Further, it is preferable that motion detection region is set near the border of the screen. Thus, in a preferred embodiment of the present invention, four motion vector detection regions 1, 2, 3 and 4 are set near the border of the bit-plane.

Figure 6:
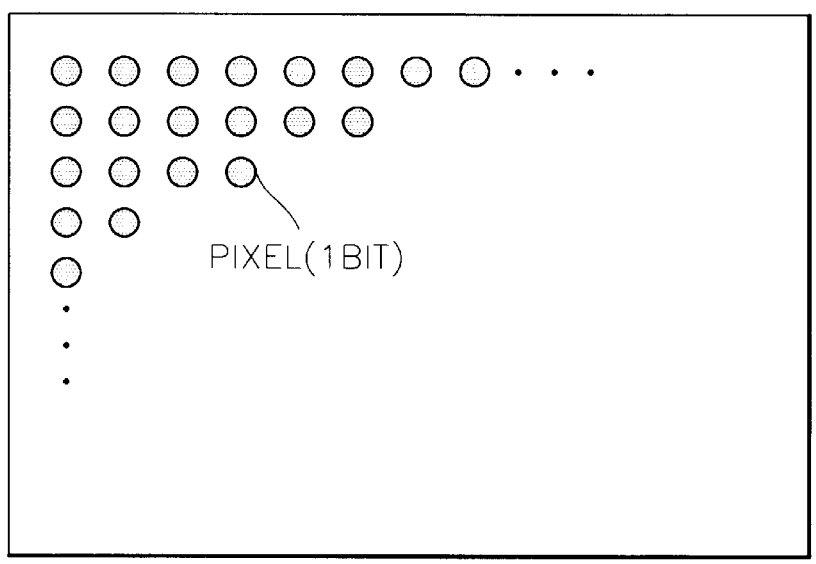
FIG. 6 is a diagram showing binary pixels in the motion vector detection region of a bit-plane shown in FIG. 5.
Figure 7:
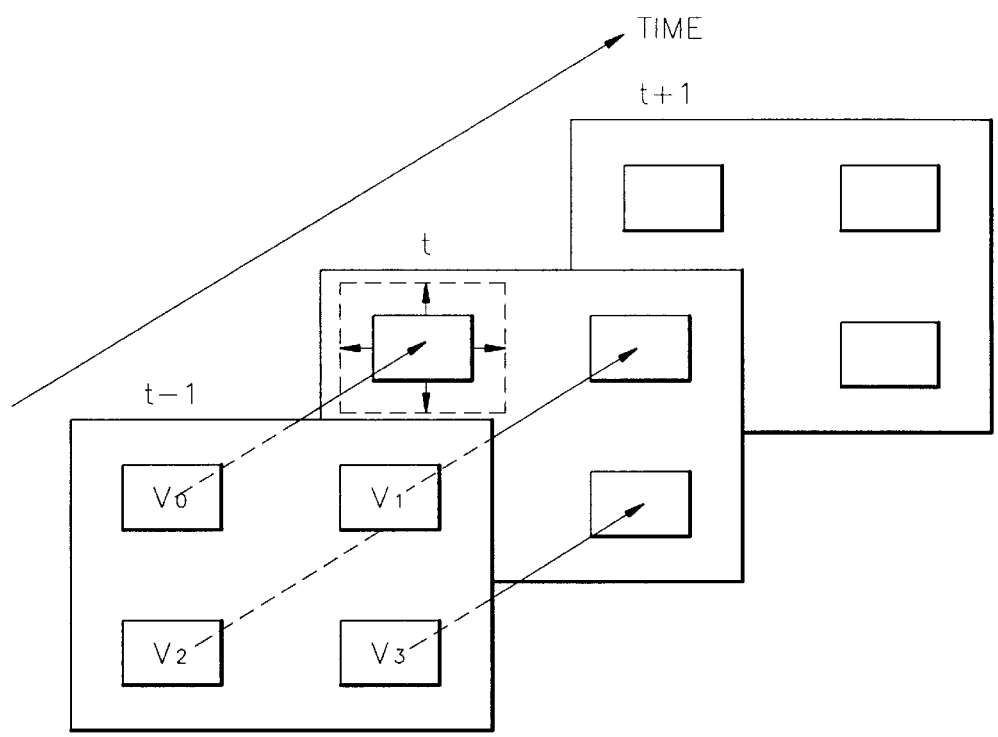
FIG. 7 illustrates a bit-plane matching technique between two fields according to the present invention.

FIG. 6 shows binary pixels in the motion vector detection region of a bit-plane, shown in FIG. 5. The bit-plane comparator/calculator 204a sequentially generates a plurality of detection windows each having the same magnitude as the motion detection region in a predetermined search region of the current bit-plane, which is indicated as a dotted rectangle in FIG. 7. Then, the bit-plane comparator/calculator 204a compares the pixel values of the detection window with the pixel values of the motion detection region in the previous bit-plane stored in the bit-plane memory. That is, the bit-plane comparator/calculator 204a performs exclusive-OR (XOR) operations with respect to the binary pixel values of the motion detection region in the previous bit-plane and the pixel values of the detection window of the current bit-plane, as shown in equation (4), and the correlation value accumulator 204b accumulates the results of the XOR to obtain a final correlation value.

$$P(i, j) = \sum_x \sum_y [a_m^{t-1}(x, y) \text{XOR} a_m^t(x+i, y+j)], 0 \le m \le k-1 \quad (4)$$

where $a_m^t(x, y)$ denotes m-th bit-plane at time t, (l, j) denotes the motion vector that is the amount of movement of the detection window from the motion detection region in the horizontal and vertical directions, and P(l, j) represents the correlation value of the corresponding to the motion vector. Further, in the equation (4) it is assumed that the size of the motion detection region is (k×k).

Figure 8:
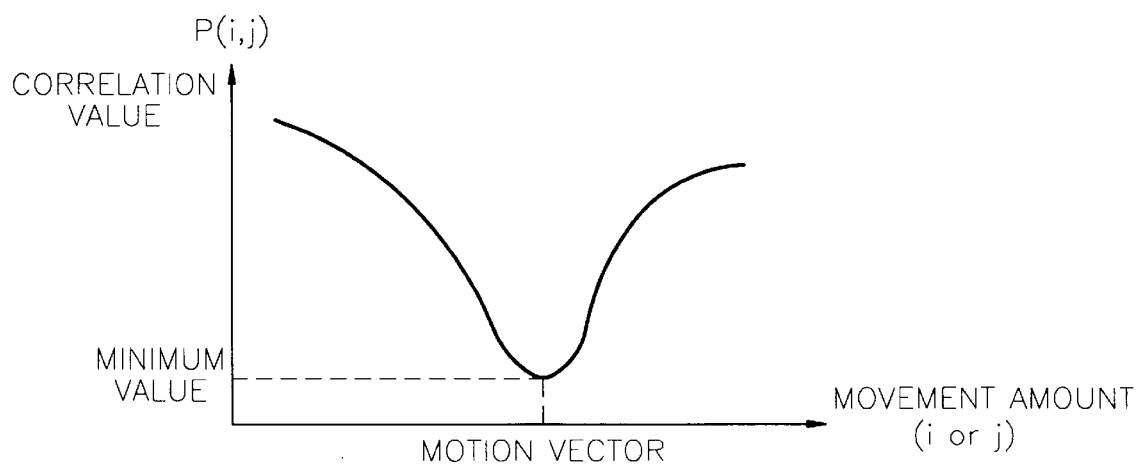
FIG. 8 is a graph showing the characteristic of the correlation value with respect to the amount of movement.

FIG. 8 shows the characteristic of the correlation value with respect to the amount of movement. As can be seen in FIG. 8, the correlation value is minimum at a position which corresponds to an actual displacement of the image due to the trembling of the hand, and increases with the increase/decrease of an assumed amount of movement. Thus, the motion vector calculator 206 of FIG. 2 determines the position at which the correlation value is at its minimum as the movement of images between the fields. Such a process is performed for four motion detection regions, and each movement amount is determined as a motion vector $V_n$ ($0 \le n \le 3$) of each detection region. Finally, an average value of the motion vectors for the four motion detection regions is determined as an overall motion vector.

$$V_n = (i, j) = \arg \min[P(i, j)] \quad (5)$$

On the other hand, the image stabilizing method of the present invention can be applied to image recording/reproducing apparatuses other than the video camera, such as a digital video cassette recorder (DVCR) and digital still camera (DSC). For example, in the case of a DVCR, the trembling of the hands which were reflected in the image signal being recorded camera can be compensated for, while being recorded, by using the image stabilizing apparatus according to the present invention. Alternatively, the trembling of the hands which were introduced while the image was captured by using a photographic device such as a video camera can be corrected by using the image stabilizing apparatus of the present invention while the recorded image signal is reproduced.

As described above, in the image stabilizing apparatus and the method thereof for correcting the motion of the input image by using bit-plane matching, the required memory capacity can be reduced because the binary image information of only a specific bit-planes from the input image information is stored in a memory. Also, because a simple logic operation is performed on the bit-plane, the overall calculation speed is increased. Furthermore, since exclusive-OR operations required during the matching of the bit-planes can be carried out by a simple circuit, the structure of the overall image stabilizing system is simplified.

What is claimed is:

1. An image stabilizing apparatus of an image recording apparatus comprising:

a memory for storing input digital image information;

a motion detecting circuit for calculating an amount of movement of input image information between two screens by using bit-plane matching technique and generating a motion vector of the input image; and a motion correcting circuit for receiving the motion vector generated by the motion correction circuit and correcting the movement of the input image information by the moving image information stored in the field memory in an opposite direction to a direction of the motion vector.

2. The image stabilizing apparatus of claim 1, wherein the motion detecting circuit comprises:

a bit-plane extractor for extracting bit-planes from input digital image information;

an optimum bit-plane detector for detecting an optimum bit-plane suitable for detecting motion among the bit-planes extracted by the bit-plane extractor;

a bit-plane memory for storing the optimum bit-plane detected by the bit-plane detector;

a bit-plane correlation value detector for comparing pixel values of the optimum bit-plane of a previous screen stored in the bit-plane memory and pixel values of the optimum bit-plane in a current screen to calculate correlation values between pixels of the bit-planes, and accumulating the calculated correlation values; and a motion vector calculator for calculating the motion vector from the accumulated correlation value.

3. An image stabilizing method in an image recording apparatus, the method comprises the steps of:

(a) detecting a motion vector of an input image using a bit-plane matching technique; and (b) correcting motion of an image recording apparatus by moving the input image in an opposite direction to a direction of the detected motion vector.

4. The image stabilizing method of claim 3, wherein the step (a) comprises the steps of:

(a1) extracting bit-planes from digital image information;

(a2) selecting an optimum bit-plane among the extracted bit-planes;

(a3) storing the optimum bit planes of a previous screen and a current screen;

(a4) comparing pixel values of the optimum bit-plane of the previous screen stored in the bit-plane memory and pixel values of the optimum bit-plane in the current screen to calculate correlation values between pixels of the bit-planes, and accumulating the calculated correlation values; and (a5) calculating a motion vector from the accumulated correlation value.

5. The image stabilizing method of claim 4, wherein the step (a2) comprises the steps of:

(a2a) initializing an optimal bit-plane index m and an average bit conversion rate $C_{avg}$;

(a2b) calculating a bit conversion rate $C_m$ of an optimal bit-plane determined by the optimal bit-plane index m;

(a2c) determining whether an absolute value of the difference between the calculated bit conversion rate $C_m$ and the average bit conversion rate $C_{avg}$ is equal to or less than a predetermined threshold value; and (a2d) maintaining a current bit-plane if the absolute value is less than or equal to the threshold value, and changing the bit-plane if the absolute value is greater than the threshold value.

6. The image stabilizing method of claim 5, wherein the average bit conversion rate is reset to $$C_{avg} = \frac{C_m + C_{avg}}{2}$$

if the current bit-plane is maintained in the step (a2d).

7. The image stabilizing method of claim 5, wherein the changing of the bit-plane in the step (a2d) comprises the steps of:

determining whether the bit conversion rate $C_m$ is greater than the average bit conversion rate $C_{avg}$; and selecting an upper bit-plane if the bit conversion rate $C_m$ is greater than the average bit conversion rate $C_{avg}$, and a lower bit-plane if the bit conversion rate $C_m$ is not greater than the average bit conversion rate $C_{avg}$.

8. The image stabilizing method of claim 5, further comprising the step of setting a predetermined number of motion detection regions in the selected optimum bit-plane, wherein pixel values of the optimum bit-plane of a previous screen are compared with pixel values of the optimum bit-plane in a current screen with respect to pixel values in the predetermined number of motion detection regions.

* * * * *